United States Patent

Ernst

[11] 4,009,759
[45] Mar. 1, 1977

[54] CULTIVATOR APPARATUS

[76] Inventor: Arnold E. Ernst, Wolverton, Minn. 56594

[22] Filed: Mar. 26, 1975

[21] Appl. No.: 562,016

[52] U.S. Cl. ............................. 172/395; 172/134; 172/180; 172/181; 172/182; 172/488; 172/507; 172/574

[51] Int. Cl.² ................. A01B 63/16; A01B 63/26; A01B 37/00; A01B 49/02

[58] Field of Search ............ 172/613, 21, 134, 174, 172/488, 178, 507, 180, 676, 181, 182, 192, 201, 318, 321, 395, 398, 423, 574, 575, 619, 623, 624, 627, 629, 662, 691, 705, 415; 111/89

[56] References Cited

UNITED STATES PATENTS

| 203,048 | 4/1878 | Johnson | 172/507 X |
|---|---|---|---|
| 258,782 | 5/1882 | Lynch | 172/624 |
| 351,154 | 10/1886 | Bilz | 172/507 X |
| 1,040,879 | 10/1912 | Calvin | 172/181 X |
| 1,046,621 | 12/1912 | Mason | 172/415 |
| 1,074,763 | 10/1913 | Wills | 172/507 |
| 1,155,833 | 10/1915 | Melton | 172/180 |
| 1,176,514 | 3/1916 | Berthelote | 172/178 |
| 1,667,866 | 5/1928 | Olson | 172/395 |
| 1,740,841 | 12/1929 | Smith | 172/395 X |
| 1,835,095 | 12/1931 | Schanil | 172/181 X |
| 1,886,438 | 11/1932 | Weeks | 172/676 X |
| 1,916,637 | 7/1933 | Rhodes | 172/180 |
| 2,691,930 | 10/1954 | Forgy | 172/398 X |
| 2,881,845 | 4/1959 | Aitkenhead | 172/627 X |
| 3,040,818 | 6/1962 | Mattson | 172/575 X |
| 3,157,234 | 11/1964 | Bezzerides | 172/178 X |
| 3,608,646 | 9/1971 | Ryan | 172/627 |
| 3,680,648 | 8/1972 | Tonsfeldt | 172/201 X |

FOREIGN PATENTS OR APPLICATIONS

| 248,409 | 1/1961 | Australia | 172/395 |
|---|---|---|---|
| 434,319 | 9/1926 | Germany | 111/89 |
| 607,926 | 9/1948 | United Kingdom | 172/624 |

Primary Examiner—Paul E. Shapiro
Attorney, Agent, or Firm—Henderson, Strom & Sturm

[57] ABSTRACT

A cultivator apparatus attached to a draw bar hitched to a tractor and having a tool bar attached to the draw bar and movable therewith. A cultivating mechanism is attached to the tool bar and is movable between positions of engagement and disengagement with the ground when the tool bar is moved. A plurality of cultivating units comprise the cultivating mechanism and are independently movable about the tool bar. A lateral support mechanism is comprised of gauge wheels mounted intermediate the ends of each of the cultivating units. Each gauge wheel is laterally offset with respect to the cultivating unit to which it is attached.

5 Claims, 12 Drawing Figures

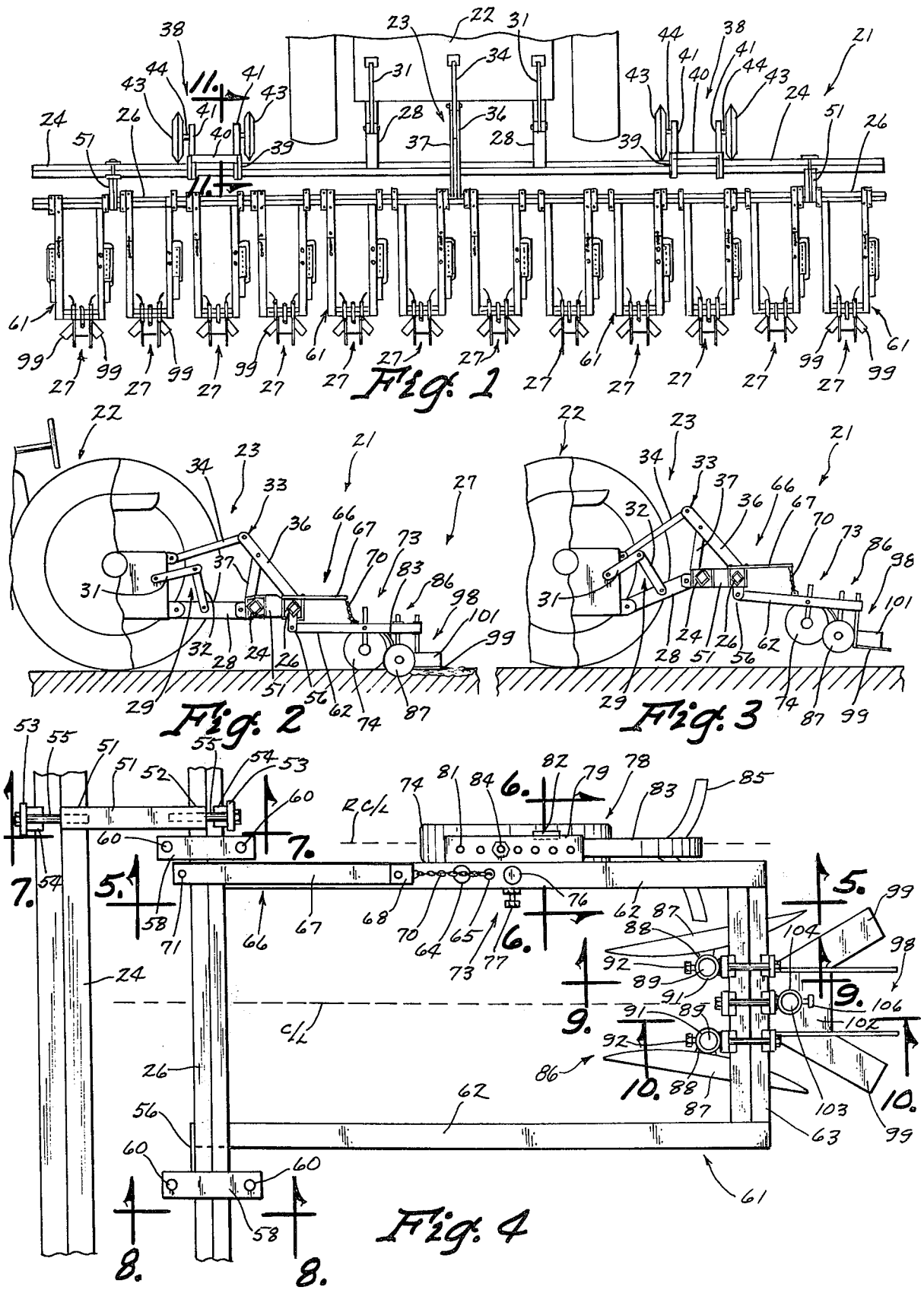

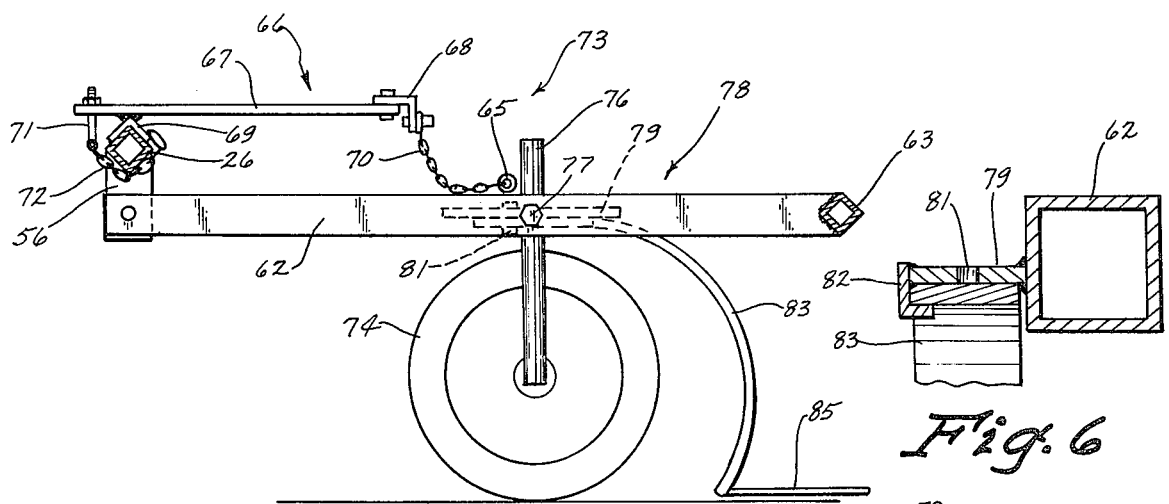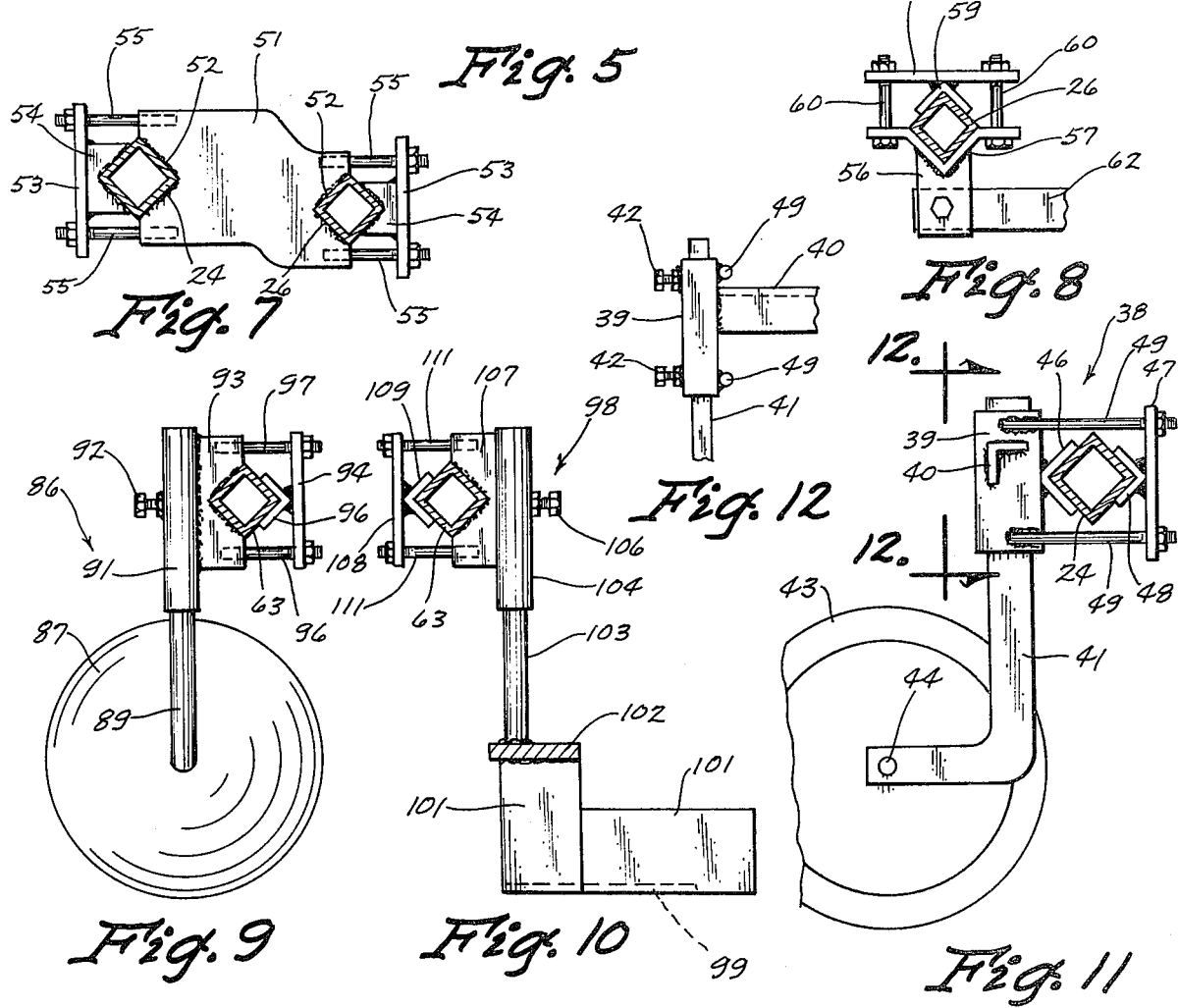

CULTIVATOR APPARATUS

BACKGROUND OF THE INVENTION

The present invention relates generally to cultivators, and more particularly to a cultivator having a specific mounting apparatus, wherein each cultivator device is independently mounted on the tractor yet having a mechanism for lifting all of the cultivators at one time.

Cultivators having a plurality of rigidly mounted cultivator devices have several disadvantages. If the cultivator is drawn over uneven terrain, some of the cultivator devices penetrate the ground too deeply and others not deeply enough. It is standard practice, therefore, to level the ground first and thereafter to cultivate. A time consuming and energy wasting extra passage over the fields is thereby necessitated.

One of the most critical problems in mounting cultivator devices independently of one another, is the one of obtaining a mounting which is rigid enough to withstand the continual pressure exerted on a cultivator in use, without using a bulky or cumbersome structure. In particular, it has been a problem to keep an individually mounted cultivator from wobbling or twisting, a condition which causes uneven cultivating or even severing of the crops. Parallelogram lever systems, such as that shown in U.S. Pat. No. 2,337,662, have normally been used in the individual mounting of cultivators, but it has been found that more lateral support to the cultivator is needed.

SUMMARY OF THE INVENTION

The invention relates to a cultivator having an improved structure for mounting a number of cultivator units individually so that each can respond to the particular contours of the ground. The improved structure includes means for improved lateral support for each device, and a system for lifting all of the cultivator devices from the ground at one time.

A tool bar is detachably mounted to a draw bar hitched to a tractor. A cultivating mechanism is attached to the draw bar, the individual units of the mechanism being laterally disposed along the length of the tool bar and independently pivotable about the tool bar. A lateral support mechanism is attached to the cultivating mechanism, each of the individual gauge wheels of the support mechanism being attached to a cultivating unit intermediate the ends of that unit. The cultivating mechanism and lateral support mechanism are moved to engage with or disengage from the ground by movement of the tool bar and draw bar by the hitch.

It is an object of this invention to provide a cultivator apparatus which will result in a saving of time and energy during field work by eliminating the number of trips over the fields which are necessary for proper cultivation.

It is a further object of this invention to provide a cultivator having independently movable and adjustable cultivating units for allowing the cultivator to more closely follow the contour of the field.

Still another object of this invention is to provide a cultivator having an improved lateral support mechanism for preventing the wobbling or twisting of the cultivating units and for minimizing damages to crops.

A further object of this invention is to provide a cultivator apparatus suitable for cultivating a variety of crops.

Another object of this invention is to provide a cultivator apparatus of sturdy construction and economical manufacture.

These objects and other features and advantages of the present invention will become readily apparent by reference to the following description when considered in conjunction with the accompanying drawings.

BRIEF DESCRIPTION OF THE DRAWINGS

The appended drawings illustrate the invention wherein:

FIG. 1 is a fragmentary, top plan view of the cultivator apparatus of this invention in attachment with a tractor;

FIG. 2 is a fragmentary side elevational view with part of the tractor cut away to more clearly show the cultivator apparatus of this invention in engagement with the ground;

FIG. 3 is a view similar to that of FIG. 2 only depicting the cultivator apparatus in the raised position, disengaged from the soil;

FIG. 4 is an enlarged, fragmentary top plan view depicting an individual cultivator unit of the cultivator apparatus;

FIG. 5 is a fragmentary longitudinal sectional view, taken along line 5—5 in FIG. 4 and depicting the lateral support means of an individual cultivator unit;

FIG. 6 is an enlarged, fragmentary cross sectional view taken along line 6—6 in FIG. 4;

FIG. 7 is an enlarged, cross sectional view taken along line 7—7 in FIG. 4;

FIG. 8 is an enlarged, cross sectional view taken along line 8—8 in FIG. 4;

FIG. 9 is a cross sectional view taken along line 9—9 in FIG. 4 and depicting a disk member of an individual cultivator unit;

FIG. 10 is a cross sectional view taken along line 10—10 in FIG. 4 and depicting a sweep blade of an individual cultivator unit;

FIG. 11 is an enlarged, cross sectional view taken along line 11—11 in FIG. 1 and depicting a row guide member of the cultivator apparatus; and FIG. 12 is a fragmentary, end elevational view taken along line 12—12 in FIG. 11.

DESCRIPTION OF THE PREFERRED EMBODIMENT

Referring now to the drawings, the cultivator apparatus of this invention is indicated generally at 21 in FIG. 1. The cultivator apparatus 21 is connected to a tractor 22 by a three-point hitch 23. The cultivator 21 includes more particularly a draw bar 24, a tool bar 26 and a cultivating mechanism including a plurality of cultivator units 27.

Referring to FIGS. 2 and 3, the three-point hitch 23 includes hitch members 28 pivotally attached at one end to the tractor 22 and at the other end to the draw bar 24. Outside articulated working arms 29 have first and second arm members 31,32 pivotally connected, the first arm members 31 being also pivotally attached to the tractor 22 and the second arm members 32 being also pivotally attached to the hitch members 28 intermediate the ends of the hitch members 28. The inside articulated follower arm 33 has first, second and third arm members 34, 36, 37. The first and second arm members 34,36 are pivotally connected, the first arm member 34 being also pivotally attached to the tractor 22 and the second arm member being also pivotally attached to the tool bar 26. The third arm member 37 is affixed at one end to the draw bar 24 and at the other end is pivotally attached to the second member 36. Conventional hydraulic apparatus, not shown here, is operably attached to the three-point hitch 23 for actuating the hitch 23 to move the cultivator apparatus 21 between a lowered position of engagement with the ground and a raised position of disengagement from the ground.

Referring again to FIGS. 1, 2 and 3 the draw bar 24 is pivotally attached to the hitch members 28 and has a rectangular cross section. Forward row guides or guide wheel units 38 are attached to the draw bar 24 on either side of the tractor 22 and forward of the draw bar 24. Referring to FIGS. 11 and 12, each row guide unit 38 includes a pair of elongated members 39 having a bore formed therethrough, which members 39 are joined by an angle iron cross member 40. L-shaped shafts 41 are slidably received within the bores of the members 39 and are secured therein by set screws 42 attached to the members 39. Guide wheels 43 are rotatably affixed to the tips of the forwardly extended portions of the shafts 41 by axles 44. A formed angular member 46 is attached, as by weldment, to each elongated member 39, and a plate 47 having a formed angular member 48 welded thereto is attached by means of bolts 49 to the elongated member 39, the angular members 46,48 fitting against the draw bar 24 and causing the row guide unit 38 to be securely clamped to the draw bar 24.

Referring to FIGS. 1 and 7, the tool bar 26 is rectangular in cross section and is affixed to and rearwardly of the draw bar 24 by support members 51. The support members 51 are S-shaped and have angular formations 52 at each end for receiving the tool bar 26 and draw bar 24. Plates 53, having formed angular members 54 attached as by weldment thereto, are affixed by bolts 55 to the ends of the support members 51, the angular members 52,54 fitting against the draw bar 24 and tool bar 26, the tool bar being thereby securely attached to the draw bar 24. Referring to FIG. 8, a plurality of downwardly and forwardly disposed members 56, having formed angular plates 57 affixed thereto as by weldment, are clamped to the tool bar 26 by plates 58 having formed angular members 59 welded thereto, the plates 57,58 being connected by bolts 60 and the tool bar 26 being received by the angular plates 57 and the angular members 59.

Referring to FIGS. 1 and 4, a plurality of cultivator units 27 are disposed laterally along the tool bar 26. Each of the cultivator units 27 of the cultivating mechanism includes a frame member 61, a bracing member 66, sweep mechanisms for cutting 78, 98, and a disk unit 86. Individual gauge wheel units 73 of the lateral support mechanism are affixed to each of the cultivator units 27.

Referring to FIGS. 4 and 5, the frame member 61 of each cultivator unit 27 is U-shaped and includes parallel elongated side members 62. Both side members 62 are pivotally attached at one end to depending members 56 and are joined together at their opposite ends by a transverse member 63. The members 62,63 are rectangular in cross section. Holes 64 are formed in the member 62 bearing the gauge wheel unit 73 of the lateral support mechanism, the unit 73 being slidably received within one of the holes 64. A ring 65 is affixed to and intermediate the ends of the side member 62 which bears the gauge wheel unit 73.

The bracing member 66 of each cultivator unit 27, illustrated in FIGS. 4 and 5, includes an elongated member 67 having an angle iron 68 affixed to one end and having proximate to the opposite end a formed angular member 69 welded to the underside thereof. A chain member 70 extends from the angle iron 68 to the ring 65. A bolt 71 extends downwardly from the member 67, and a chain 72 extends from the lower end of the bolt 71, underneath and against the tool bar 26 and to the angular member 69, the tool bar 26 being received between the chain 72 and the angular member 69.

Referring again to FIGS. 4 and 5, an individual gauge wheel unit 73 of the lateral support mechanism is attached to each of the cultivator units 27. The unit 73 includes a ground engageable gauge wheel 74 rotatably affixed to a shaft 76. The shaft 76 is slidably received within one of the holes 64 formed in the member 62 and is secured therein by a set screw 77 attached to the member 62.

A sweep mechanism for cutting 78, FIGS. 4, 5 and 6, is affixed to each cultivator unit 27. The sweep 78 includes a plate 79 perpendicularly affixed to the member 62 adjacent the gauge wheel unit 73. Adjustment holes 81 are formed in the plate 79 along its length. A downwardly disposed flange 82 is affixed to the rearwardly disposed portion of the plate 79, and a tine member 83 is held at one end against the underside of the plate 79 by the flange 82. A set screw 84 threaded through one of the holes 81 secures the tine 83. The tine 83 at its downwardly disposed end forms into a pair of cutting blades 85. The tines 83 of the cultivator units 27 at each end of the tool bar 26 have only one cutting blade 85, which blade 85 is curved inwardly toward the other cultivator units 27.

The disk unit 86, FIGS. 4 and 9, of each cultivator unit 27 includes a pair of disks 87 rotatably mounted by axles 88 to shafts 89. The shafts 89 are slidably received within the bores of cylindrical members 91 and are held therein by set screws 92 threaded through the members 91. The members 91 have a formed angular member 93, and plates 94 having formed angular portions 96 welded thereto are attached by bolts 97 to the formed member 93. The disk unit 86 is thereby clamped to and forwardly disposed of the transverse member 63 of the frame 61, the transverse member 63 being received by the formed members 93, 96.

A sweep mechanism for cutting 98, FIGS. 4 and 10, is attached to the transverse member 63 of each cultivator unit 27 immediately behind the disk unit 86. A pair of cutting blades 99 are perpendicularly attached to a pair of vertical plates 101. The plates 101 are connected by a transverse plate 102, and a shaft 103 is perpendicularly affixed to the forward center portion of the plate 102. The shaft 103 is slidably received within the bore of the cylindrical member 104 and held therein by a set screw 106. The member 104 has a formed angular portion 107, and a plate 108 having an angular member 109 welded thereto is attached by bolts 111 to the portion 107. The transverse member 63 of the frame 61 is received between the portion 107 and the member 109, and the sweep 98 is thereby disposed rearwardly of the disk unit 86.

When the cultivator apparatus 21 is to be operated, the cultivating and lateral support mechanisms are first adjusted. The sweeps 78, 98 and disk units 86 of the individual cultivator units 27 and the individual gauge wheel units 73 are adjusted.

The sweeps 78 are properly adjusted in securing the tine 83 to the plate 79 by the set screw 84 in the appropriate hole 81. The disk units 86 and sweeps 98 are adjusted by sliding the shafts 89, 103 within the members 91, 104 until the appropriate disposition is obtained and then tightening the set screws 92, 106. The guage wheel units 73 are also adjusted by sliding the shafts 76 within the member 62 and then tightening the set screw 77. Lateral adjustment of the disk units 86 and sweeps 98 is obtained by changing the place of securement to the transverse members 63. Coarser lateral adjustment, of the whole cultivator unit 27, may be obtained by changing the place of securement of the depending members 56 along the tool bar 26.

The row guides 38 are also adjusted. The shafts 41 are movable within the members 39, and the guides 38 may be affixed at various places along the length of the draw bar 24.

The cultivator apparatus 21 is transported to the field in the raised position depicted in FIG. 3, the hydraulic apparatus of the tractor 22 having actuated the three-point hitch 23 to elevate the cultivator 21. Upon reaching the field, the cultivator 21 is lowered into engagement with the ground, as shown in FIG. 2, by hydraulic actuation of the three-point hitch 23. As the tractor 22 pulls the cultivator 21 across the field, the row guides 38 and the tines 83 of the two outside sweeps 78 guide the tractor 22. At each end of the field, the cultivator 21 is elevated so that tractor 22 may turn.

As the cultivator 21 is drawn over the field, the sweeps 78 shear off grass and weeds growing between the rows of crop. The disks 87 of each unit 86 straddle a row of crop and part the soil on each side and adjacent to the row of crop. The disks 87, oriented at an appropriate angle to the row of crops, turn dirt away from the crops, and the blades 99 of the sweep 98 knife off by the roots weeds and grasses adjacent the row of crop. For a crop of sugar beets, the gauge wheel 74 of each unit 73 is adjusted so that the discs 87 and blades 99 penetrate the soil to a depth of 2 inches (5.08 cm).

The individual cultivator units 27 are free to move upwardly or downwardly with respect to each of the other cultivator units 27. Each of the units 27 follows the ground closely, always penetrating to the desired depth and never cutting sometimes too deep or sometimes not at all, as is quite often the case with cultivators having rigidly affixed units and particularly when moving over uneven terrain. When an individual unit 27 is forced upwardly by a rock in the field, the other units 27 are not forced upwardly thereby and made to miss a portion of their respective rows of crop as would be the case with a normal, rigid cultivator.

Each unit 27 pivots freely about the tool bar 26, the chain 70 not becoming taut except when aiding in elevating and holding the unit 27 in the disengaged position shown in FIG. 3 or when preventing too precipitous a downward pivot in the unlikely event of the cultivator 21 being drawn over an unusually deep depression. The floating action of the individual cultivator units 27 allows the cultivator 21 to be drawn over fields which have not been leveled first, thereby eliminating the time and energy expenditure of making a trip over the fields drawing a leveling implement.

FIG. 4 depicts the center line C/L of an individual cultivator unit 27 and the radial center line RC/L of the gauge wheel 74 of the unit 73 of the lateral support mechanism. The disk unit 86 and sweep 98 straddle the center line C/L, which is collinear with the row of crop when the cultivator 21 is in operation, and the gauge wheel unit 73 is offset with respect to the center line C/L at least one width of the gauge wheel 74. The cultivator unit 27 is thereby steadied and laterally supported against wobbling and twisting, and the cultivator 21 is prevented from damaging the crops.

The cultivator 21, with appropriate adjustments, is suitable for cultivating sugar beets, soybeans and sunflower crops. It therefore can be seen that the objects of this invention have been attained.

Although a preferred embodiment of the cultivator apparatus 21 has been disclosed herein, it is to be remembered that various modifications and alternate constructions can be made thereto without departing from the full scope of the invention, as defined in the appended claims.

I claim:

1. A cultivating apparatus for row crops for use with a tractor having a three point hitch arrangement, a draw bar adapted to be connected to the three point hitch arrangement whereby the draw bar is movable by tractor operation of the three point hitch arrangement between a ground working position and a transport position, and a tool bar secured to the draw bar in parallel relation and behind the draw bar relative to the tractor, said apparatus comprising:

cultivating means pivotally connected at one end to the tool bar and extending rearwardly of the tool bar, said cultivating means including a plurality of individual cultivator units each pivotally attached to the tool bar, each of said cultivator units being independently pivotally movable about the tool bar;

each cultivator unit including a frame member, a disk unit and a first sweep means, said frame member having one end pivotally affixed to the tool bar and having a free end, said disk unit being mounted on said free end, said disk unit including a pair of laterally disposed rotatably mounted disks, said disks being adjacent to a row of crops, one each of said disks being disposed on opposite sides of the row of crops when said cultivating means is in the ground working position, said first sweep means being mounted on said free end between said disks and immediately rearward of said disks;

means for supporting said cultivating means upon the ground, said means for supporting including a plurality of gauge wheels, each cultivator unit intermediate its ends having one of said gauge wheels affixed thereto;

means for independently adjusting the vertical and horizontal position of each of said gauge wheels with respect to each respective frame member including a plurality of substantially vertically aligned openings disposed in each respective frame member, an internally threaded horizontally aligned opening disposed in each of said frame members intersecting with each of said vertically aligned openings, a shaft disposed in one of said vertically aligned openings of each of said frame members and selectively receivable in at least one other of the other vertically aligned openings of the frame members for allowing horizontal adjustment, said gauge wheels being rotatably mounted to the bottom of each of said shafts;

threaded set screw means for reception in the horizontally aligned openings for selectively positioning each of the shafts vertically with respect to the frame member and thereby selectively positioning the gauge wheel with respect to said frame; and wherein said first sweep means and said disk unit are aligned along the longitudinal center line of said cultivator unit, said frame member including side members and a transverse member, said side members being at one end thereof pivotally attached to the tool bar and at the opposite end thereof joined by said transverse member, said disk unit and said first sweep means being mounted on said transverse member, the radial center line of said gauge wheel being parallel to and offset from said longitudinal center line whereby such nonalignment of said gauge wheel with respect to said cultivator unit provides lateral support to said cultivator unit, each of said cultivator units having a second sweep means for cutting attached to said frame member intermediate its ends and directly above said gauge wheel, said second sweep means arcing downwardly therefrom immediately rearward of said gauge wheel, said second sweep means terminating in cutting blades disposed above and adjacent the ground surface in the space between the adjacent rows of crop whereby weeds growing between the rows of crop are cleared away and the soil loosened when said cultivating means is in the lowered position.

2. A cultivator apparatus as defined in claim 1 and further wherein the degree of offset is at least one gauge wheel width.

3. A cultivator apparatus as defined in claim 1 and further wherein said means for cultivating includes a bracing member affixed at one end to said tool bar and having affixed to the opposite end a chain member, said chain member interconnecting said bracing member and said frame.

4. A cultivator apparatus as defined in claim 1 and further wherein said first sweep means includes first and second laterally disposed assemblies, each of said assemblies including a plate and a blade, said plate being vertically disposed, normal to the tool bar and parallel to the row of crop, said blade being affixed to said plate, said first and second assemblies being disposed on opposite sides of the row of crop, said plates of said first and second assemblies being disposed in facing relationship, said blades being extended from said plates away from the row of crop above and adjacent the surface of the ground.

5. A cultivator apparatus as defined in claim 4 and further wherein said disks and said cutting blades are movable laterally and vertically with respect to said frame member.

* * * * *